April 2, 1957  H. J. M. FÖRSTER  2,787,170
SPEED CHANGE TRANSMISSION PROVIDING FOR BRAKING OF DRIVEN SHAFT
Filed March 17, 1953  2 Sheets-Sheet 1
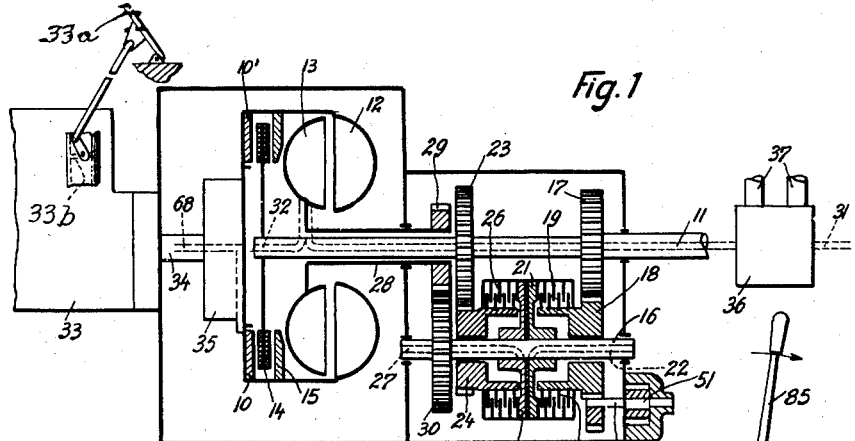
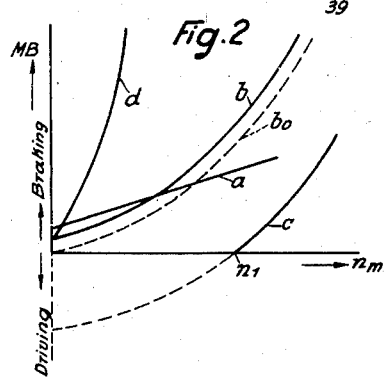
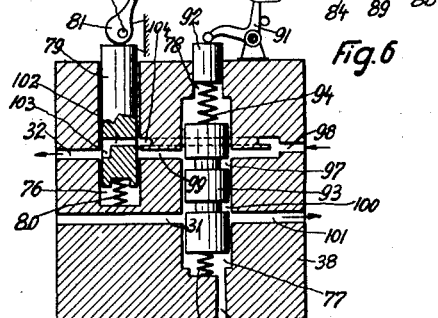
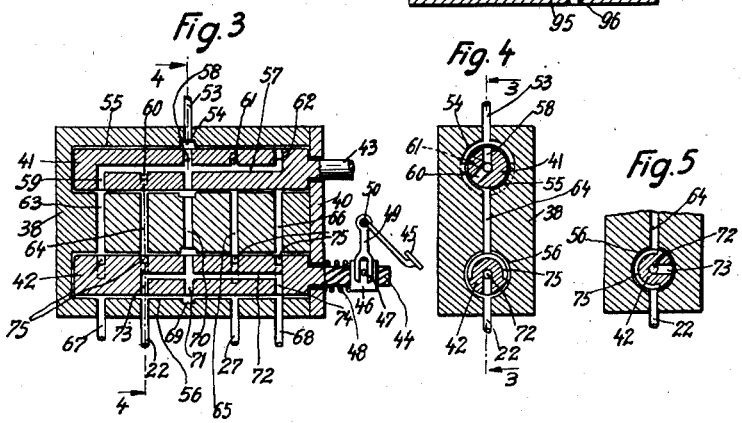
Inventor
Hans-Joachim M. Förster
By Wicke, Padlon and Craig
Attorneys April 2, 1957  H. J. M. FÖRSTER  2,787,170
SPEED CHANGE TRANSMISSION PROVIDING FOR BRAKING OF DRIVEN SHAFT
Filed March 17, 1953  2 Sheets-Sheet 2
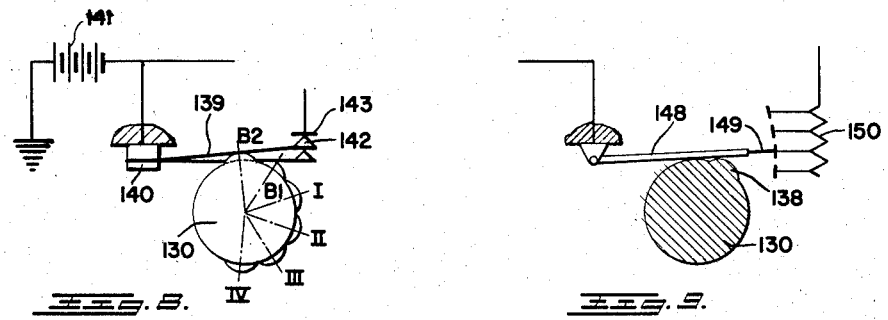
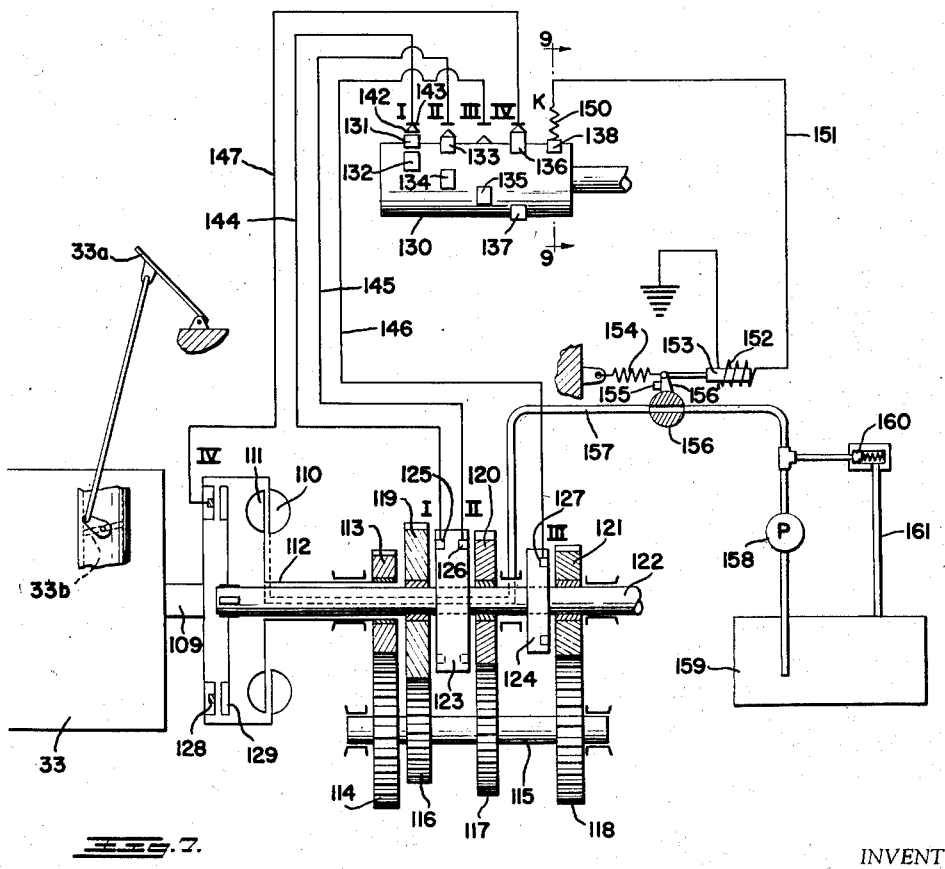
INVENTOR
HANS JOACHIM M. FÖRSTER
BY *Dicke, Padlon and Craig*
ATTORNEYS

United States Patent Office 2,787,170
Patented Apr. 2, 1957

2,787,170

SPEED CHANGE TRANSMISSION PROVIDING FOR BRAKING OF DRIVEN SHAFT

Hans Joachim M. Förster, Stuttgart-Bad Cannstatt, Germany, assignor to Daimler-Benz Aktiengesellschaft, Stuttgart-Unterturkheim, Germany Application March 17, 1953, Serial No. 342,892

Claims priority, application Germany March 19, 1952

18 Claims. (Cl. 74—645)

My invention relates to a method of braking a shaft driven by a transmission and to an improved speed change transmission for carrying out such method and is particularly applicable to motor vehicles.

More particularly, my invention relates to a method of braking the driven shaft of a transmission by means of a hydrodynamic device, such as a hydrodynamic clutch or a hydrodynamic torque convertor, such device forming part of a speed change transmission comprising power-transmitting members adapted to establish various driving connections between the driving member and the driven shaft, part of such connections including said hydrodynamic device and another part of said driving connections being, as it were, shunted across said hydrodynamic device.

It is the object of the present invention to provide a method of braking the driven shaft which is simple and reliable in operation and is based on the dissipation of the kinetic energy by fluid friction rather than mechanical friction thus avoiding abrasion, such as germane to mechanical friction.

It is another object of the present invention to provide a speed change transmission and controlling means therefor permitting the use of a hydrodynamic clutch or a torque convertor forming part of such transmission for producing a braking couple, and to provide improved means permitting to control such braking couple in dependence on both the speed of the driven shaft and a value selected by the driver for the rate of speed.

According to a preferred feature of the present invention, the hydrodynamic device, such as a hydrodynamic clutch or torque convertor, is caused to produce a braking couple as a result of the simultaneous selection of a power-transmitting connection for one ratio of transmission, said connection including the hydrodynamic device, and of another power-transmitting connection which is correlated with another ratio of transmission and bypasses the hydrodynamic device. As a result of the simultaneous selection of two power-transmitting connections correlated to different ratios of transmission, the primary rotor and the secondary rotor of the hydrodynamic device are positively driven at such different rates of speeds as to produce eddy currents in the liquid filling of the device thereby dissipating energy.

My invention involves the advantage that additional braking elements may be dispensed with and that a powerful braking couple will be produced acting in a smooth and flexible manner.

My novel hydraulic braking method is far superior to the orthodox generation of a braking couple by the engine, because with my novel method a powerful braking couple may be produced without racing the engine thus avoiding the noise and wear incidental to the operation of the engine as a brake at excessive numbers of revolution. Since, moreover, the speed ratio of the primary rotor and of the secondary rotor of the hydrodynamic device will remain constant during the braking operation as a result of the interposed mechanical gearing, the hydrodynamic device will operate at a constant slippage and, therefore, with a constant efficiency.

For the braking operation such power-transmitting members may be selected for operation as are correlated to consecutive ratios or to "remote" ratios. For a definition of the term "remote" ratios reference may be had to the usually more or less geometrical series of ratios of transmission. In this series two ratios which do not directly follow one another but have one or more intermediate ratios are termed "remote" ratios. The higher the difference between the two ratios is, the more powerful will be the braking couple produced. For the control of the braking effect the hydrodynamic device itself may be controlled, for instance by a variation of its liquid filling that can be controlled by known means, such as the provision of scooping means, or by controlling its internal pressure by adjustable vanes, or by relative axial displacement of the rotors, or the like. Since the engine may be so operated as to produce either an additional braking couple or a driving couple, the total braking effect produced resulting from both the function of the hydrodynamic clutch and the function of the engine may be controlled within certain limits by operation of the accelerator or other member controlling the engine power.

Moreover, the present invention relates to a preferred modification of the hydrodynamic device and to means for an economical exploitation of the heat produced by the braking operation.

My invention will be explained hereinafter by reference to a preferred embodiment thereof illustrated in the accompanying drawings in which Fig. 1 is a more or less diagrammatic longitudinal vertical section taken through a speed change transmission including a hydrodynamic clutch, such transmission being suitable for practicing my novel braking method;

Fig. 2 is a graph illustrating the braking and driving couples produced with different conditions of operation at different speeds;

Fig. 3 is a sectional view of a control valve mechanism adapted to control certain ducts shown in Fig. 1, the section being taken along line 3—3 of Fig. 4;

Fig. 4 is a sectional view of the same control valve mechanism, the section being taken along line 4—4 of Fig. 3;

Fig. 5 shows a lower portion of Fig. 4 with a valve element represented therein in a different position;

Fig. 6 is a sectional view of another control mechanism cooperating with that shown in Figs. 3, 4 and 5 and adapted to control other ducts indicated in Fig. 1;

Fig. 7 is a schematic control diagram for an electrically-actuated transmission, with parts thereof shown in cross section;

Fig. 8 is a left side view of the control drum 130 of Fig. 7, and

Fig. 9 is a cross sectional view taken along lines 9—9 of Fig. 7.

A motor vehicle speed change transmission to which my invention is applicable is shown and described for instance in Figs. 1, 1a and 2 of my patent application Serial No. 245,131 filed on September 5, 1951, now Patent No. 2,756,616 dated July 31, 1956. Since reference may be had to such prior patent application for a detailed disclosure of the transmission, it is deemed sufficient for a disclosure of the present invention to briefly described such transmission hereinafter with reference by the diagrammatic representation in Fig. 1.

Such speed change transmission comprises, broadly speaking, a driving member 10, a driven shaft 11, and power-transmitting members adapted to establish various driving connections between said driving member 10 and said driven shaft 11 thereby establishing any one of a plurality of different ratios of transmission between the driving member 10 and the driven shaft 11. A hydrodynamic device, such as a hydrodynamic clutch composed of a primary rotor 12 and a secondary rotor 13, both provided with vanes and containing a liquid filling, is included in the transmission.

More particularly, the speed change transmission includes a friction clutch composed of the members 14 and 15 adapted to establish a direct power-transmitting connection between the driving member 10 and the driven shaft 11, a second shaft 16 and disengageable means for gearing said second shaft 16 to the driven shaft 11 at various ratios of transmission. In the embodiment shown, such disengageable means comprise a pair of meshing gears 17, 18, gear 17 being fixed to shaft 11 and gear 18 being rotatably mounted on shaft 16 and adapted to be clutched thereto by means of a multi-disk friction clutch having a set of disks 19 carried by shaft 16 for common rotation and a set of interleaved disks 20 mounted on gear 18 for common rotation therewith. An actuating member 21 is axially movable on shaft 16 and adapted to act upon the interleaved disks 19 and 20 to engage the clutch constituted thereby. The actuator 21 forms a piston adapted to be operated by pressure fluid admitted through a duct 22. Similarly, another pair of meshing gears 23, 24 having a ratio of transmission different from that of gears 17, 18 is mounted on shafts 11 and 16 and adapted to be selected for operation by a fluid-operable actuator 25 acting on a multi-disk friction clutch 26. Operating fluid is admitted to the actuator 25 through a duct 27. In this manner, the driven shaft 11 and the second shaft 16 may be geared to one another at various ratios of transmission.

Means are provided including the hydrodynamic clutch 12, 13 establishing a driving connection between the driving member 10 and the second shaft 16. Such means comprise a sleeve 28 connected to the secondary rotor 13 of the hydrodynamic clutch, a gear 29 attached to the sleeve 28, and a gear 30 meshing therewith and fixed to shaft 16.

In normal operation of the transmission one only of the clutches 14, 15, 26 and 19, 20 is brought to engagement at a time. As explained in detail in my above recited prior patent application, the transmission is set to direct or fourth speed by engaging clutch 14, 15, to third speed by engaging clutch 26, and to second speed by engaging clutch 19, 20. When the transmission is set to fourth speed the driving member 10 will be connected with the driven shaft 11 through the friction clutch 14, 15 and the elements 13, 28, 29, 30 and 16 will run idly being driven by the hydrodynamic clutch. When the transmission is set to third speed the clutches 14, 15 and 19, 20 are disengaged; the driving torque will be transferred from driving member 10 to the primary rotor 12 of the hydrodynamic clutch, thence to the secondary rotor 13 thereof and through the sleeve 28 and the pair of gears 29 and 30 to the second shaft 16. From there the power is transmitted through the pair of gears 24, 23 to the driven shaft 11. Similarly, when the transmission is set to second speed the power will be transferred through the hydrodynamic clutch to shaft 16 and thence through the pair of gears 18 and 17 to the driven shaft 11.

The hydrodynamic clutch is of a type in which the primary rotor and the secondary rotor provided with vanes constitute a hollow container having a liquid filling and communicating with a duct 31 for the discharge of liquid to the hydrodynamic clutch and with another duct 32 for the admission of liquid from the hydrodynamic clutch.

In the embodiment shown, the driving member 10 is driven by the engine 33 of a motor vehicle through a shaft 34 which is preferably connected with the driving member 10 by a disengageable friction clutch 35 adapted to be engaged and disengaged by a suitable actuator (not shown). The driven shaft 11 is geared to the wheels of the vehicle.

For the purpose of braking the vehicle I engage both the friction clutch 14, 15 and the disengageable means 19, 20 or 26 at the same time. As a result, the hydrodynamic device 12, 13 will act as a brake, because the primary rotor 12 thereof will be driven at the rotary speed of the engine, whereas the secondary rotor 13 thereof will be driven by the power-transferring train of elements 14, 11, 17, 18, 16, 30, 29 and 28, the relative speed of the two rotors 12 and 13 depending on whether the clutch 19, 20 or the clutch 26 has been engaged. The total braking effect produced on the driven wheels of the vehicle is composed of the braking couple produced by the engine and of the braking couple produced by the hydrodynamic device.

Where $M_B$=braking couple,
$M_m$=engine couple,
$M_K$=clutch couple,
$i$=ratio of the two speeds put in operation,
$n_m$=R. P. M. of the engine,
$D_K$=clutch diameter,
$k$=clutch coefficient as a function of the slippage, the condition expressed by the following formula prevails, since the driving shaft delivers to the secondary rotor 13 of the hydroynamic device a driving torque increase at the ratio $i$ through the selected power-tranmitting members 17, 18 or 23, 24, but it itself driven through clutch 14, 15 with the engine couple only:

$$M_B = k \cdot \left(\frac{n_m}{i}\right)^2 \cdot D_K^5 \left(\frac{1}{i} - 1\right) + M_m$$

In the graph of Fig. 2 the abscissa represents the number of revolutions, whereas the ordinate denotes the couple. In this graph I have shown the braking couple $M_B$ as a function of the number of revolutions of the engine. The graph $a$ represents a braking couple produced with the orthodox use of the engine with the transmission being shifted to a low speed, for instance the second speed. This braking couple is substantially proportional to the rate of speed of the engine. In contrast thereto is the braking couple generated in accordance with my invention by the simultaneous selection of two actuators, such as 21 and 25. This braking couple expressed by the above formula is repersented by a substantially parabolic curve $b_0$ representing, for instance, the variation of the braking couple when the actuators for the third speed and the fourth speed are operated at the same time, the engine being disconnected by disengaging clutch 35, while $b$ represents the variation of the total braking couple produced by the engine and by the transmission with the simultaneous operation of the third speed actuator and the fourth speed actuator. As shown in Fig. 2, the variation of $b$ is similar to that of the graph $a$ at low numbers of revolution, but quickly rises thereabove for higher speeds.

Since the total braking couple is composed of the braking couple produced by the engine and the braking couple produced by the hydrodynamic clutch, the driver being able by operating the accelerator 33$a$ to convert the braking couple of the engine into a driving couple, the total braking effect may be controlled within certain limits by operation of the accelerator 33$a$, i. e. by controlling the engine power. The accelerator 33$a$ is operatively connected, for example, with the butterfly valve 33$b$ in the inlet manifold to control the output of the engine. However, the accelerator 33$a$ may also be connected with any other means for adjusting the engine output, such as for example, with the regulating rod of a fuel injection pump. The graph $c$ represents the surplus of the driving torque produced by the engine over the braking couple produced by the transmission. As indicated by this graph, full engine power yields a driving couple within the lower speed range, which driving couple will drop to zero at a certain number $m$ of revolution. For higher speeds the resultant couple will be a braking couple even with full power operation of the engine which means that the braking couple produced by the transmission will overcome the maximum driving couple produced by the engine.

As the graph $d$ shows, the efficiency of the braking effect will be considerably increased by the simultaneous operation of actuators correlated to remote speeds, for instance to the fourth speed and the second speed. As a consequence of my novel braking effect the necessity will no longer arise for the driver to brake the vehicle by shifting the transmission to first or second speed when utilizing the braking couple produced by the engine. Therefore, the power-transmitting members establishing the second speed may be equipped with a free-wheeling clutch in a manner similar to that disclosed in my above cited prior application with reference to the power-transmitting elements establishing the first speed. The provision of both the first speed and the second speed members with free-wheeling clutches simplifies the gear shifting operation.

With respect to the high braking couples to be produced under certain conditions by the hydrodynamic device, the latter must be so dimensioned and constructed as to meet the specific requirements as a braking element. This applies particularly where such hydrodynamic device is the only brake available for higher speeds, means being provided for such purpose to operate two actuators correlated to remote speeds, such as the fourth speed and the second speed. In such event, means for controlling the power consumption by the hydrodynamic device are indispensable, such means comprising mechanism, for instance, for changing the amount of filling of the hydrodynamic clutch. In order to avoid shocks incidental to the commencement of the hydraulic braking operation, the braking couple may be controlled in dependence on the speed of the driven shaft or may be temporarily reduced at the commencement of the braking operation by the simultaneous operation of the accelerator of the engine.

In order to increase or reduce the factor $k$ of the hydrodynamic clutch when the vehicle is coasting, the engine being driven from the wheels, the hydrodynamic clutch may be specially designed for instance in a non-symmetrical manner.

Moreover, I prefer to provide cooling means co-operating with the discharge duct of the hydrodynamic device to thereby dissipate the heat produced in the liquid which fills the hydrodynamic clutch. Thus, I have shown in Fig. 1 a heat exchange device 36 through which the liquid from the clutch is conducted through the discharge duct 31, cooling water being circulated therethrough by means of pipes 37. Alternatively, the device 36 may be formed by an air-cooled radiator transferring the heat either to the atmosphere or to the interior of the passenger compartment.

While the disengageable means for setting up the various ratios of transmission are preferably friction clutches, such as the clutches 19, 20, 26 or 14, 15, my invention is equally applicable to transmissions in which such disengageable means are of other types. I prefer, however, to use a transmission in which at least the two power-transmitting connections to be put in operation simultaneously include friction clutches thereby ensuring a smooth effect of the hydrodynamic device when acting as a brake. As stated above, it is also preferable under certain circumstances to provide a clutch, such as 35, to separate the engine 33 from the transmission. This applies particularly where the engine is of limited flexibility and does not operate smoothly at low speeds.

In Figs. 3 and 4 I have illustrated a preferred embodiment of the controlling means adapted to cause engagement at the same time of both the friction clutch 14, 15 and the disengageable means, such as 26.

In a valve housing 38 which may be mounted on the housing 39 of the transmission shown in Fig. 1 there are provided two cylindrical bores 55 and 56 suitably closed by a cover plate 40, each accommodating a cylindrical rotatable valve member 41, or 42 respectively. Each valve member is integral with a shaft 43, or 44 respectively, extending through a hole in the cover plate 40 and connected with suitable actuating means adapted to turn the shaft for operation of the valve.

The member 41 is a ratio setting valve adapted to be moved to any one of five different angular positions relatively displaced by 72°. Such positions correspond to first speed, second speed, third speed, fourth speed, and neutral. The valve member 42 is a brake valve capable of being adjusted to one or the other of two positions relatively displaced by 90°, one position being shown in Fig. 4 and the other one being shown in Fig. 5. The brake valve member 42 may be connected with any suitable adjusting means, for instance with a brake pedal 45. In the embodiment shown shaft 44 is provided with a high pitch thread engaging a nut 46 having two lateral trunnions 47 and urged by a helical spring 48 to an outer position. The trunnions 47 are engaged by the fork-shaped ends of a yoke 49 fixed to a shaft 50. The latter is rotatably mounted in suitable stationary bearings not shown. To the same shaft the brake pedal 45 is fixed. Hence, it will appear that when the driver steps on pedal 45, shaft 50 will be turned in clockwise direction thereby shifting nut 46 contrary to the tendency of spring 48 and thus rotating shaft 44 and valve member 42 from the position shown in Fig. 5 to the position shown in Fig. 4.

A suitable source of fluid under pressure, such as a pump, supplies both the liquid for the control of the actuators 21, 25 etc. adapted to set the transmission to the various ratios, and the liquid for the hydrodynamic device 12, 13. In the embodiment shown, such pump is formed by a gear pump 51 driven by a shaft 52 suitably geared to the driven shaft 11 (Figure 1). For a more detailed disclosure of the source of pressure fluid reference may be had to my above mentioned prior patent application Serial No. 245,131, now Patent No. 2,756,616 dated July 31, 1956, in which two such pumps are provided, one geared to the driven shaft and the other one geared to the driving member 10, both so cooperating that fluid under pressure will be available at any time unless both the engine and the driven shaft are at rest.

The pump 51 feeds the pressure liquid through a duct 53 leading to valve casing 38 and communicating with an internal groove 54 of bore 55. The valve member 41 has an axial duct 57 intersected by a diametrical bore 58 which registers with the groove 54. The duct 57 has four branches 59, 60, 61, 62 leading to the periphery of member 41. The two bores 55 and 56 of valve casing 38 are interconnected by ducts 63, 64, 65 and 66 located in a common plane extending through the axes of the bores 55 and 56. These ducts 63, 64, 65 and 66 may be brought to registry with the branches 59, 60, 61 and 62 of duct 57. It will be understood, of course, that one of such branches only at a time will register with the associated duct 63, 64, 65, or 66 respectively. Co-axially extending to the latter there are ducts 67, 22, 27 and 68 also provided in valve casing 38 and communicating with the bore 56 and extended by suitable pipes to the ratio actuators, such as 21 and 25. Only one of such additional actuators is diagrammatically shown in Fig. 1 in form of an annular piston 10' movable in axial direction within the driving member 10 by fluid pressure admitted through the duct 68. Such additional actuators are fully disclosed and described in the above mentioned co-pending application. The valve member 42 is provided with four peripheral grooves 75 indicated in Fig. 3 by dotted lines and adapted when valve member 42 is in the position of Fig. 5 to establish a communication between the opposite ducts, such as 63 and 67, or 64 and 22, or 65 and 27, or 66 and 68. For that purpose, the peripheral grooves 75 extend over an arc of about 200° as shown in Figs. 4 and 5.

Bore 56 is provided with an annular groove 69 which communicates with groove 54 through a duct 70 and registers with a diametrical duct 71 provided in valve member 42. The diametrical duct 71 is intersected by an axial duct 72 of valve member 42. The duct 72 has two radial branches 73 and 74 extending parallel to the diametrical branch 71 and adapted to register with the ducts 22 and 68 when valve member 42 is in the position shown in Fig. 4. When valve member 42 is turned to the position shown in Fig. 5, however, the two branch ducts 73 and 74 are closed.

From the foregoing it will appear that when valve member 42 is in the position of Fig. 5 for normal operation of the motor vehicle, valve member 42 establishes a communication of ducts 63, 64, 65 and 66 with the coordinated ducts 67, 22, 27 and 68. Which of the four actuators, such as 21 and 25, will be operated at any time depends entirely on the angular adjustment of valve member 41. In Fig. 4 valve member 41 shown is in the position in which the actuator for the first speed is supplied with fluid under pressure from pump 51 via ducts 53, 54, 58, 57, 59, 63, 75 and 67.

When the driver wishes to brake the vehicle he will depress pedal 45 thereby rotating valve member 42 from the Fig. 5 position to the Fig. 4 position. This will interrupt the communication between the ducts 63, 64, 65 and 66 on the one hand and the ducts 67, 22, 27 and 68 on the other hand. At the same time a communication will be established leading from pump 51 via ducts 53, 54, 58, 70, 71, 72, 73 and 74 to the ducts 22 and 68, whereby the actuator 21 and the actuator 10' operating clutch 14, 15 will be operated at the same time, irrespective of the position of valve member 41 and of the speed ratio which had been previously set up in the transmission by such valve 41. It will be recalled that the actuators now operated are correlated with the second speed and the fourth speed. As a result, the hydrodynamic device 12, 13 will now act as a brake in the manner heretofore described.

In Fig. 1 the driving member 10 is diagrammatically represented as forming a cylinder having an annular cross section in which the annular piston 10' is movable and adapted to be urged to the right by fluid pressure admitted through the duct 68 thereby engaging clutch 14, 15.

In the embodiment illustrated in Figure 7 the drive shaft 109 drives the hollow shaft 112 through the hydrodynamic clutch including the input member 110 and the output member 111, of which the input member 110 is fixedly connected with the driving shaft 109 which the output member 111 is fixedly connected with the hollow shaft 112. A gear 113, which is secured to the hollow shaft in any suitable manner for common rotation therewith, as by means of splining or the like, constantly meshes with a gear 114 mounted on the second shaft 115. The gears 116, 117 and 118, as well as gear 114, are fixedly mounted on shaft 115 for common rotation therewith. The gears 116, 117 and 118 mesh at all times with gears 119, 120 and 121, respectively. The gears 119, 120 and 121 are rotatably mounted on the driven shaft 122 by means of suitable bearings. The gears 119, 120 and 121 may be coupled for common rotation with the driven shaft in any suitable manner, such as, for example, by electromagnetic clutches which are formed by the disk members 123 and 124. The disk members 123 and 124 comprise windings 125, 126 and 127 to provide the desired electromagnetic pull necessary to couple the corresponding adjacent gears with the driven shaft 122. The disk members 123 and 124 are fixedly mounted on the driven shaft 122 for common rotation therewith.

The forwardly extending portion of the driven shaft 122 is provided with a clutch disk 129, which co-operates with the electromagnetic clutch 128, which is fixedly secured to the driving shaft 109 and therewith to the input member 110 of the hydrodynamic clutch. Upon energization of the winding 128, the clutch disk 129 is attracted so that the driving shaft 109 and the driven shaft 122 are coupled with each other, thereby establishing a direct connection.

A manually operable shifting drum 130 serves for purposes of engaging the various transmission ratios which are possible with this transmission. It is, of course, understood that the number of the transmission ratios which may be obtained by a transmission of the type illustrated either in Figure 1 or 7, may be readily varied by merely varying the number of pairs of meshing gears mounted on the driven shaft 11 or 122 and on the second or side shaft 16 or 115, respectively, which may be operated selectively by appropriate clutches.

The drum 130 of Figure 7 is provided with cams 131 and 132 for the first speed, with cams 133 and 134 for the second speed, with cam 135 for the third speed, and with cams 136 and 137 for the fourth speed. Furthermore, a cam 138 is provided on the drum 130 for regulating the amount of filling of the hydrodynamic clutch. One resilient spring contact lever 139 each co-operates with the cam portions for the first speed, the second speed, the third speed and the fourth speed, respectively. Each of the contact arms 139 is securely fastened as at 140 and is connected with a source of electric power 141 in such a manner that during passage of each of the cams through the upper position illustrated in Figures 7 and 8, the corresponding arm 139 is raised by a corresponding amount so that the contact portion 142 arranged at the end of the arm 139 opposite the end 140 and extending in a direction away from the drum 130, comes in contact with corresponding contact element 143. Upon closing of the contact 142 with the contact element 143 a circuit is established in a corresponding line 144, 145, 146 and 147 to energize the windings 125, 126, 127 and 128, respectively, of the electromagnetic clutches for the first speed to the fourth speed of the transmission.

The further cam 138 provided on the drum 130 co-operates with a lever or arm 148 which is also connected with the power supply 141 and which during passage of the cam 138 through the upper position of the drum 130 illustrated in Figures 7, 8 and 9 more or less raises the arm 148. The end of arm 148, which is formed as a contact 149, thereby passes over a resistance element 150 which in turn is connected with the winding 152 of an electromagnet by the line 151. Depending on the amount of current which passes through the winding 152, which is a function of the setting of the end 149 of the arm 148 with respect to the resistance 150, the core 153 of the electromagnet is more or less attracted against the action of a spring 154 which under conditions of minimum energization of the winding 152 normally urges the core 153 leftwardly, as viewed in Figure 7 until the valve member 156 is moved into a position where its external control arm 156, which is connected through appropriate linkage with the core 153, comes to rest against the stop member 155. In other words, when no current or minimum current flows through the coil 152, the control member 156' of the valve 156 is rotated counter-clockwise until it assumes the position shown in Figure 7 thereby offering minimum throttling. Upon attraction of the core 153 by the flow of more current through the coil 152, an adjustment of the valve 156 results which produces increasingly greater throttling. Thus, more or less throttling effect by the valve 156 may be readily obtained. The valve 156 is interconnected in a line 157 which connects a pump 158 with the hydrodynamic clutch through the interior of the driven shaft 122, the liquid supplied by the pump 158 constituting the fluid medium between the input member 110 and the output member 111 of the hydrodynamic clutch. The pump draws its oil from reservoir 159, it being understood that the hydrodynamic clutch may be connected with the reservoir 159 through suitable return ducts, as shown, for example, in a schematic manner in Figure 1. The excess amount of oil is returned to the reservoir 159 by the pump 158 through a line 161 provided with an excess pressure valve 160.

The drum 130 may be placed into six distinct control positions, which are designated in Figure 8 by reference numerals B₂, B₁, I, II, III, and IV. Of course, the number of positions used depends on the number of speeds. The positions indicated by reference numerals I through IV designate positions which correspond to the positions of the forward speeds I through IV, while two braking positions are designated with B₁ and B₂. The cams 132 through 137, which serve for purposes of individually actuating the speeds I through IV, are displaced on the drum in a circumferential direction with respect to each other. In the braking position B₂ a cam 131 and a cam 136 are provided which co-operate with the contact arms of the first and fourth speed. In the braking position B₁ an additional cam 133 is provided. The cam 136 is thereby extended in the circumferential direction to such an extent that it is simultaneously effective also in the position B₁.

Whereas in the positions I through IV of Figure 8 only one of the cams 132 through 137 is operative at a time and therewith only one of the windings 125 through 128 is energized, in the position B₁, both the cams 133 and 136 are effective or operative while in a position B₂, both the cams 131 and 136 are operative. Accordingly, in the position B₁ the second and fourth speeds are simultaneously actuated, while in the position B₂ both the first and fourth speed are engaged. In view of the greater difference in rotational speed between the first and fourth speed, a particularly effective braking action will be provided under those conditions by the turbulence produced thereby in the hydrodynamic clutch 110 and 111.

The cam 133 may further be made in such a manner that in a portion of the range of the position B₁ it has its greatest height which decreases in the direction towards the position B₂ thereof. It is possible to thereby obtain in the range of the cam position B₁, and possibly also in the position of B₂, a regulation or adjustment of the amount of liquid filling in the hydrodynamic clutch in that the input line for the liquid to the hydrodynamic clutch may be throttled or completely interrupted when the drum 130 is rotated to occupy a position in which the cam 133 with the highest portion thereof passes through the upper position illustrated in Figures 7 through 9. However, by corresponding positioning of the drum 130 it is thereby also possible to obtain complete filling and therewith maximum braking action in the position B₁ and at least also in the position B₂.

An example of a controlling means is illustrated in Fig. 6. In the valve housing 38 there are provided a cylindrical bore 76 and a cylindrical cavity 77 parallel thereto and communicating with a bore 78 of smaller diameter leading to the outside. In bore 76 there is movably mounted a cylindrical valve member 79 urged by a spring 80 to the outer position shown, but adapted to be depressed to an inner position by a cam 81 pivoted on a stationary shaft 82 and connected by a link 83 to an arm 84 rotatably mounted on shaft 44 of valve member 42. In this embodiment, the pedal 45 and the nut 46 are omitted and replaced by a hand lever 85 which is mounted on shaft 44 and non-positively connected therewith by suitable detent means not shown. Lever 85 has a nose 86 adapted to engage a projection 87 on lever 84. The latter is normally held by a spring 88 in contact with a stop 89. The lever 85 is movable between two angular positions corresponding to the angular positions of valve 42 shown in Figs. 4 and 5. When so moved valve 42 will be carried along by lever 85 through the intermediary of the detent means heretofore mentioned. When lever 85 is rocked in clockwise direction indicated by the arrow beyond the position in which valve 42 is brought to the position of Fig. 4, the valve member 42 is arrested by a suitable stop not shown and the lever 85 will then act through its nose 86 on arm 84 and rock the same in clockwise direction starting from the position shown in Fig. 6. When that happens, cam 81 will depress valve 79.

Link 83 has a pin-and-slot connection 90 with one arm of a bell crank 91 fulcrumed on a stationary pivot and having another arm adapted to depress a plunger 92 slidably fitted in the bore 78. A cylindrical control valve 93 is slidably mounted in the cylindrical cavity 77 and its end faces are engaged by springs 94 and 95, the former acting against plunger 92 and the latter resting on the bottom of cavity 77. The latter communicates with a branch 96 of duct 53 and is thus supplied with fluid under pressure. Since pump 51 is geared to the driven shaft 11, it will be appreciated that the pressure produced by such pump is a function of the rotary speed of the driven shaft 11 increasing as such speed increases. Therefore, valve 93 constitutes speed-controlled means responsive to the speed of the driven shaft 11.

The valve member 93 has a peripheral groove 97 adapted in an upper position of the valve member 93 to establish a communication between a pair of opposed ports provided in cavity 77, one of such ports communicating with a branch 98 of pressure line 53 and the other port communicating with a duct 99. The valve member 93 is provided with another peripheral groove 100 adapted in a lower position of the valve member 93 to establish a communication between another pair of ports which are disposed in cavity 77 in opposed relationship, one of such ports communicating with the discharge duct 31 of the hydrodynamic device and the other port communicating with a return line 101.

The valve member 79 is provided with a diametrical duct 102 communicating with a recess 103 which in any position of valve member 79 communicates with admission duct 32 of the hydrodynamic device. In the depressed position of valve member 79 its duct 102 communicates with duct 99. In its upper position duct 102 communicates with a branch 104 of duct 98 connected to pressure line 53.

The operation of the controlling means shown in Fig. 6 is as follows: In the position shown, the hydrodynamic device 12, 13 is connected to pump 51 via 53, 98, 104, 102, 103 and 32. When lever 85 is rocked in clockwise direction from its normal position (not shown), it will first turn valve member 42 to its Fig. 4 position thus causing fluid under pressure to be supplied to both the actuators 10' and 21, whereby the full braking couple will be produced. By a further rocking motion of lever 85 in clockwise direction beyond the position shown in Fig. 6 arm 84 will be rocked causing valve member 79 to be depressed, whereby the communication between ducts 102 and 104 will be interrupted and a communication between ducts 102 and 99 will be established. Therefore, the braking couple now depends on the position of valve member 93. The position of this valve member depends on the pressure acting on its bottom end face through duct 96, which pressure, in its turn, depends on the speed of driven shaft 11 and thus on the rate of travel of the vehicle. Moreover, the position of valve member 93 depends on the bias of spring 94 which will be increased by rocking motion of lever 85 in the direction of the arrow.

With a low bias of spring 94 a comparatively low rate of travel of the vehicle will be sufficient to cause upward displacement of valve member 93. As a result, such valve member will be operative above a low speed limit to establish a communication between pressure line 98 with supply line 32 of the hydrodynamic clutch via duct 99, whereby the hydrodynamic device will be enabled to produce the full braking couple. Should the rate of travel of the vehicle, however, drop below such speed limit, spring 94 will overcome the pressure in the lower end of cavity 77 and will depress valve member 93 whereby the discharge duct 31 will be put in communication with the return line 101. Hence, the liquid filling of the hydrodynamic clutch 12, 13 will be rapidly diminished under the effect of the centrifugal force, the liquid being discharged through ducts 31 and 101, whereby the braking couple is reduced to a low value or to zero.

The rate of travel determining the depression of valve 93 depends on the adjustment of lever 85. If such lever is further rocked in the direction of the arrow, it will increase the bias of spring 94 whereby the speed limit will be raised at which the braking couple will be reduced.

Cam 81 is preferably so shaped as to effect the displacement of valve member 79, while link 83 takes up the lost motion of the connection 90. On continued movement of link 83 to the left the cam 81 will act with a dwell of constant radius on valve member 79 thus keeping the same in depressed position.

From the foregoing description it will be readily understood that the valve member 93 constitutes regulating means which control the liquid filling of the hydrodynamic clutch 12, 13 and thereby influence the braking couple. Moreover, it will be understood that the regulating means, such as valve 93, is governed by the speed-controlled means formed by pump 51 in such a manner that the filling of the hydrodynamic clutch will be increased when the rate of travel of the vehicle exceeds a certain limit. The lever 85 is an optionally operable element that is adapted to control the regulating means 93 thereby determining such rate of travel.

While I have described my invention with reference to a preferred embodiment thereof, I wish it to be clearly understood that my invention is in no way limited to the details of such embodiment, but is capable of numerous modifications within the scope of the appended claims.

What I claim is:

1. A speed change transmission comprising a driving member, a driven shaft, means including a clutch adapted to establish a direct power-transmitting connection between said driving member and said driven shaft, a second shaft, disengageable means for gearing said second shaft to said driven shaft at various ratios of transmission, means including a hydrodynamic device with input and output means establishing a driving connection between said driving member and said second shaft, and controlling means for simultaneously engaging both said clutch and said disengageable means to drivingly connect both said input and output means with said second shaft whereby said hydrodynamic device will act as a brake for said driven shaft.

2. Apparatus for braking a shaft driven by a transmission comprising a driving member, means including a friction clutch adapted for establishing a direct power-transmitting connection between said driving member and said driven shaft, a second shaft, disengageable means for gearing said second shaft to said driven shaft at various ratios of transmission, means including a hydrodynamic device establishing a driving connection between said driving member and said second shaft, and means for engaging both said friction clutch and said disengageable means at the same time whereby said hydrodynamic device will act as a brake.

3. Apparatus for braking a shaft claimed in claim 2 in which the effect of the braking operation is controlled by means for controlling the driving power applied through said driving member.

4. A speed change transmission claimed in claim 1 in which said disengageable means comprises at least two pairs of meshing gears mounted on said second shaft and said driven shaft, and disengageable clutches each co-operating with one of said pairs and adapted to enable the same to gear said second shaft to said driven shaft.

5. The combination with the speed change transmission, claimed in claim 1, of a motor and of an auxiliary friction clutch connecting said motor to the driving member of said transmission.

6. The combination set forth in claim 5, further comprising wheels geared to said driven shaft thereof, and means for simultaneously engaging said first-mentioned clutch and said disengageable means and disengaging said auxiliary friction clutch whereby said hydrodynamic device will act as a brake for the vehicle.

7. A speed change transmission claimed in claim 1 in which said controlling means is constituted by a single control element adapted to be optionally operated.

8. A speed change transmission comprising a driving member, a driven shaft, power-transmitting members adapted to establish various driving connections between said driving member and said driven shaft thereby establishing any one of a plurality of different ratios of transmission between said driving member and said driven shaft, a hydrodynamic clutch composed of a primary rotor and of a secondary rotor both provided with vanes and containing a liquid filling, said rotors being in driving connection with different ones of said members, actuators each adapted when actuated to select said power-transmitting members to thereby set up one of said ratios of transmission, controlling means adapted to cause actuation at the same time of two of said actuators, whereby said rotors will be driven at different rotary speeds and will, therefore, produce a braking couple, regulating means for controlling said liquid filling to influence said braking couple, speed-controlled means responsive to the speed of said driven shaft and adapted to govern said regulating means causing the same to increase said filling when said speed exceeds a certain limit, and an optionally operable element adapted to control said regulating means and to determine said speed limit.

9. Apparatus for braking a shaft driven by a transmission comprising a driving member, means including a friction clutch for establishing a direct power-transmitting connection between said driving member and said driven shaft, a second shaft, disengageable means for gearing said second shaft to said driven shaft at various ratios of transmission, means including a hydrodynamic device establishing a driving connection between said driving member and said second shaft, and means for engaging both said friction clutch and said disengageable means at the same time whereby said hydrodynamic device will act as a brake, the braking effect thereof being controlled by means for controlling the quantity of fluid in said hydrodynamic device.

10. A speed change transmission comprising a driving member, a driven shaft, means including a friction clutch adapted to establish a direct power-transmitting connection between said driving member and said driven shaft, a second shaft, disengageable means for gearing said second shaft to said driven shaft at various ratios of transmission, means including a hydrodynamic device establishing a driving connection between said driving member and said second shaft, and controlling means adapted to cause engagement at the same time of both said friction clutch and said disengageable means whereby said hydrodynamic device will act as a brake for said driven shaft, said controlling means being constituted by a single control element, and a brake pedal for actuating said control element.

11. A speed change transmission comprising a driving member, a driven shaft, means including a friction clutch adapted to establish a direct power-transmitting connection between said driving member and said driven shaft, a second shaft, disengageable means for gearing said second shaft to said driven shaft at various ratios of transmission, means including a hydrodynamic device establishing a driving connection between said driving member and said second shaft, and controlling means adapted to cause engagement at the same time of both said friction clutch and said disengageable means whereby said hydrodynamic device will act as a brake for said driven shaft, said hydrodynamic device being provided with a liquid filling and with ducts for the admission thereto and for the discharge therefrom of a liquid, and a valve cooperating with said ducts and adapted to control said filling to thereby influence the braking couple produced by said hydrodynamic device.

12. A speed change transmission as claimed in claim 11, in which a single actuating member is produced for the actuation of said controlling means and for the actuation of said valve.

13. A speed change transmission comprising a driving member, a driven shaft, means including a friction clutch adapted to establish a direct power-transmitting connection between said driving member and said driven shaft, a second shaft, disengageable means for gearing said second shaft to said driven shaft at various ratios of transmission, means including a hydrodynamic device establishing a driving connection between said driving member and said second shaft, and controlling means adapted to cause engagement at the same time of both said friction clutch and said disengageable means whereby said hydrodynamic device will act as a brake for said driven shaft, said hydrodynamic device including a liquid filling and being provided with an admission duct and a discharge duct for the admission and the discharge of liquid to and from said hydrodynamic device, and cooling means cooperating with said discharge duct to dissipate the heat produced in said liquid filling.

14. In a change speed transmission, input means, fluid coupling means comprising an input member connected to said input means and an output member, output means, a transmission means between said output member and said output means, another transmission means between said input member and said output means, said transmission means having different transmission ratios and each including clutch means, and means for simultaneously engaging both said clutch means to thereby engage said two transmission means for effecting braking action by said fluid coupling means.

15. In a change speed transmission, the combination according to claim 14, further comprising means for varying the amount of liquid in said fluid coupling means during operation thereof as a brake.

16. In a change speed transmission, input means, output means, fluid coupling means with an input member and an output member, said input member being connected to said input means, a plurality of torque transmitting means connected to said input member and said output member of said fluid coupling means respectively for alternately producing at least a first transmission ratio or a second transmission ratio different from said first transmission ratio between said input means and said output means, and means for simultaneously engaging both torque transmitting means for said first and said second transmission ratio to drivingly connect both said input member and said output member to thereby obtain effective braking by said fluid coupling means.

17. In a change speed transmission, the combination according to claim 16, wherein the transmission ratios of said torque transmitting means are such that said output member of said fluid coupling is driven at a higher speed than said input member with the output means driving the input means.

18. In a change speed transmission with input means and output means, hydrodynamic coupling means including an input member and an output member, a plurality of selectively engageable transmission means connected to said input member and said output member of said fluid coupling to provide selectively a plurality of transmission ratios between said input means and said output means, and means for simultaneously engaging two of said transmission means for drivingly connecting said output means with both said input and said output member with said output member driven at a higher speed than said input member and bearing a predetermined fixed ratio to the speed of said input member to obtain effective braking by said hydrodynamic coupling means.

References Cited in the file of this patent

UNITED STATES PATENTS

| | | |
|---|---|---|
| 1,959,533 | Iverson | May 22, 1934 |
| 1,960,815 | Jessen et al. | May 29, 1934 |
| 2,606,461 | Herndon | Aug. 12, 1952 |
| 2,616,308 | Burtnett | Nov. 4, 1952 |
| 2,691,901 | Maybach et al. | Oct. 19, 1954 |
| 2,693,120 | Maybach | Nov. 2, 1954 |

FOREIGN PATENTS

| | | |
|---|---|---|
| 879,801 | France | Nov. 30, 1942 |